(12) United States Patent
Yoshihara et al.

(10) Patent No.: US 6,994,228 B2
(45) Date of Patent: Feb. 7, 2006

(54) ACCUMULATOR (75) Inventors: Hisao Yoshihara, Shizuoka (JP);
Yoshiyuki Kurita, Shizuoka (JP);
Kennji Sasaki, Shizuoka (JP); Minoru Yoshida, Fujisawa (JP)

(73) Assignee: NOK Corporation, Tokyo (JP)

( * ) Notice: Subject to any disclaimer, the term of this patent is extended or adjusted under 35 U.S.C. 154(b) by 194 days.

(21) Appl. No.: 10/312,574

(22) PCT Filed: Jul. 17, 2001

(86) PCT No.: PCT/JP01/06177

§ 371 (c)(1),
(2), (4) Date: Jan. 14, 2003

(87) PCT Pub. No.: WO02/06680

PCT Pub. Date: Jan. 24, 2002

(65) Prior Publication Data

US 2003/0168463 A1 Sep. 11, 2003

(30) Foreign Application Priority Data

| Jul. 18, 2000 | (JP) | .................. 2000-216811 |
| Dec. 5, 2000 | (JP) | .................. 2000-369646 |
| Jun. 28, 2001 | (JP) | .................. 2001-195948 |

(51) Int. Cl.
*B65D 1/32* (2006.01)

(52) U.S. Cl. .................. 220/723; 220/720

(58) Field of Classification Search ............. 220/720, 220/721, 723; 138/30
See application file for complete search history.

(56) References Cited

U.S. PATENT DOCUMENTS 6,058,976 A  5/2000  Le Rossignol ............... 138/30

FOREIGN PATENT DOCUMENTS

| JP | 9-111064 | 4/1997 |
| JP | 2700594 | 10/1997 |
| JP | 10-246202 | 9/1998 |
| JP | 11-37102 | 2/1999 |

*Primary Examiner*—Stephen Castellano
(74) *Attorney, Agent, or Firm*—Jacobson Holman PLLC (57) ABSTRACT

In an accumulator which is provided in a pipe of an equipment so as to temporarily accumulate a pressure within a piping flow passage or absorb a pulsation of a fluid pressure generated within the pipe by a pump or the like, in order to improve a durability against repeated bending and stretching motions of a bladder (3) under a low temperature environment not more than 0° C., and effectively prevent a cushion gas in a gas chamber from being reduced, the bladder (3) has a laminated structure, for example, constituted of a center elastic layer (321), a gas shielding layer (322) in an outer side thereof and an outer elastic layer (323) in a further outer side thereof, the center elastic layer (321), the gas shielding layer (322) and the outer elastic layer (323) are made of a polyamide resin, and the gas shielding layer (322) has a module of bending elasticity higher than that of the center elastic layer (321) and the outer elastic layer (323).

3 Claims, 5 Drawing Sheets

ACCUMULATOR

This is a nationalization of PCT/JP01/06177, filed Jul. 17, 2001 and published in Japanese.

TECHNICAL FIELD

The present invention relates to an accumulator which is provided in a pipe of an equipment so as to temporarily accumulate a pressure within a piping flow passage or absorb a pulsation of a fluid pressure generated within the pipe by a pump or the like.

BACKGROUND ART

An accumulator absorbing a pulsation of a hydraulic pressure generated in a hydraulic piping or the like is constituted of an outer shell branched from and connected to the hydraulic piping via an oil port, and a diaphragm bladder separating an internal space of the outer shell into a pressure introduction chamber in the side of the oil port and a gas chamber in the opposite side. A pulsation of the hydraulic pressure within the piping is introduced into the pressure introduction chamber via a fluid inlet and outlet port of the oil port, whereby the bladder is displaced in a direction in which the hydraulic pressure of the pressure introduction chamber and a pressure of N2 gas charged into the gas chamber from a gas charging hole in the outer shell so as to function as a cushion gas are balanced, absorbs the pulsation, and levels a system hydraulic pressure within the piping.

However, in the case that the bladder is made of a rubber member, the cushion gas charged within the gas chamber permeates through the bladder with time little by little due to gas permeability of the rubber member. Accordingly, during a longtime use, an amount of cushion gas in the gas chamber is significantly reduced, and there is a risk that it is impossible to sufficiently achieve the function.

Figure 5:
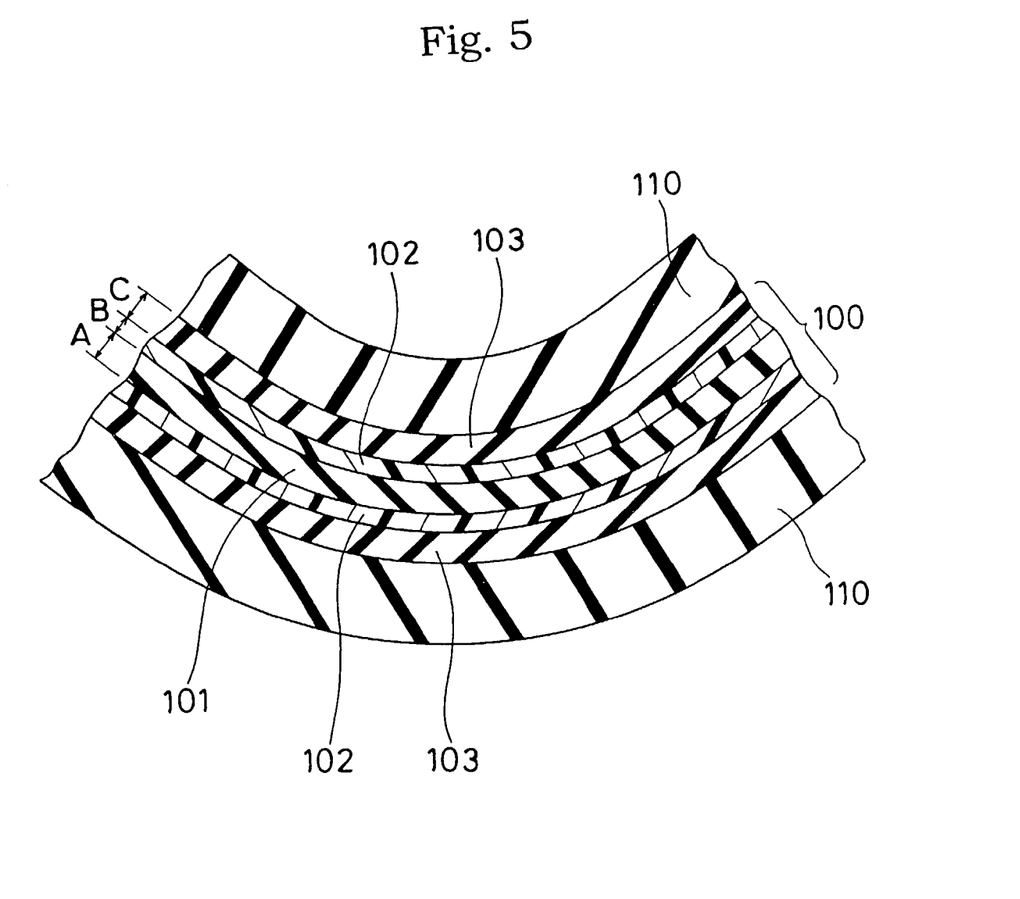
FIG. 5 is a partly cross sectional view of a bladder of an accumulator in accordance with the conventional art.

Therefore, in conventional, in order to cope with the problem mentioned above, there has been developed a technique of improving resistance to gas permeability of the bladder by making the bladder in a structure of interposing a composite layer (a gas barrier laminated body) 100 obtained by laminating a center elastic layer 101 constituted of a polyamide resin or a mixture of a polyamide resin and a polyolefine resin, a gas shielding layer 102 disposed in an outer side thereof and constituted of an ethylene-vinyl alcohol copolymer, and an outer elastic layer 103 disposed in a further outer side thereof and constituted of a polyamide resin or a mixture of a polyamide resin and a polyolefine resin within a rubber layer 110, as shown in FIG. 5.

That is, in the conventional art, when a layer thickness of the center elastic layer 101 is set to A, a layer thickness of the gas shielding layer 102 is set to B, and a layer thickness of the outer elastic layer 103 is set to C, A/B is set to be not less than 0.1 and not more than 3.5, C/B is set to be not less than 1.0 (refer, for example, to Japanese Patent No. 2700592 or the like). Further, a rate of elasticity of the center elastic layer 101 and the outer elastic layer 103 is set to be 100 to 1000 MPa, and a rate of elasticity of the gas shielding layer 102 is set to be 1800 to 3300 MPa (refer, for example, to Japanese Patent No. 2700594 or the like). Further, on the basis of the laminated structure mentioned above, it is possible to effectively prevent the cushion gas in the gas chamber 5 from being reduced due to the gas permeability in the bladder 3, and it is possible to make the durability of the bladder 3 excellent.

In the meantime, in the case of the accumulator for a motor vehicle, since an ambient temperature at night in a winter season becomes below freezing point in some areas, it is necessary to consider a temperature environment between −40° C. and −120° C. However, in accordance with the conventional art mentioned above, an excellent gas shielding function can be achieved in a temperature range from a room temperature to about 80° C., but a flexibility of the gas shielding layer 102 constituted of the ethylene-vinyl alcohol copolymer is reduced in a low temperature environment of not more than 0° C., so that a load of the shielding layer 102 becomes large due to an application of repeated bending and stretching deformation, and there is a problem that a crack and a peeling are generated and a gas shielding function is deteriorated.

The present invention is made by taking the problem mentioned above into consideration, and a technical object thereof is to provide an accumulator with a eature which can improve a durability against a repeated bending and stretching motion of a bladder under a low temperature environment of not more than 0° C., and can effectively prevent a cushion gas in a gas chamber from being reduced.

DISCLOSURE OF THE INVENTION

As a means for effectively solving the conventional technical problem mentioned above, in accordance with the present invention, there is provided an accumulator comprising:

an outer shell branched from and connected to a piping via a pressure introduction port; and a bladder separating an internal space of the outer shell into a pressure introduction chamber in the side of the pressure introduction port and a gas chamber in the opposite side, wherein the bladder has a laminated structure constituted of a center elastic layer, a gas shielding layer in an outer side thereof, an outer elastic layer in a further outer side thereof and a rubber layer in a more further outer side thereof, the center elastic layer, the gas shielding layer and the outer elastic layer are made of a polyamide resin, and the gas shielding layer has a module of bending elasticity higher than that of the center elastic layer and the outer elastic layer. Accordingly, it is possible to effectively prevent a cushion gas within a gas chamber from being reduced due to a permeation, and it is possible to maintain an initial accumulating function and a pulsation absorbing function for a long time.

As a further preferable example in the structure mentioned above, the rate of bending elasticity at −5° C. to −40° C. is set to a value of 500 to 3000 MPa in the center elastic layer, a value of 3100 to 6000 MPa in the gas shielding layer, and a value of 150 to 3000 MPa in the outer elastic layer. Accordingly, since resistance to cold is improved, a good operability of the bladder can be secured even in a low temperature environment, and it is possible to effectively prevent the cushion gas from leaking due to a crack or the like.

As another further preferable example in the structure mentioned above, the layer thickness A of the center elastic layer, the layer thickness B of the gas shielding layer and the layer thickness C of the outer elastic layer are set so that A/B is not less than 1 and not more than 3 and C/B is not less than 4 and not more than 10, whereby it is possible to secure a proper curvature at a time when the bladder is exposed to the bending deformation in the low temperature environment of not more than 0° C.

As another means for effectively solving the conventional technical problem, in accordance with the present invention, there is provided an accumulator, wherein the bladder has a laminated structure constituted of a gas shielding layer, an inner elastic layer in an outer side thereof, an outer elastic layer in a further outer side thereof and a rubber layer in a more further outer side thereof, the gas shielding layer is made of an ethylene-vinyl alcohol copolymer, the inner elastic layer is made of a polyamide resin, and the outer elastic layer is made of an ester based elastic plastic. In the structure mentioned above, it is also possible to effectively prevent the cushion gas within the gas chamber from being reduced due to the permeation and to maintain the initial accumulating function and pulsation absorbing function for a longtime.

As the other means for effectively solving the conventional technical problem, in accordance with the present invention, there is provided an accumulator, wherein the bladder has a laminated structure constituted of a gas shielding layer, an inner elastic layer in an outer side thereof, an outer elastic layer in a further outer side thereof and a rubber layer in a more further outer side thereof, the gas shielding layer and the inner elastic layer is made of a polyamide resin, and the outer elastic layer is made of an ester based elastic plastic. In the structure mentioned above, it is also possible to effectively prevent the cushion gas within the gas chamber from being reduced due to the permeation and to maintain the initial accumulating function and pulsation absorbing function for a longtime.

As further the other means for effectively solving the conventional technical problem, in accordance with the present invention, there is provided an accumulator comprising:

an outer shell branched from and connected to a piping via a pressure introduction port; and a bladder separating an internal space of the outer shell into a pressure introduction chamber in side of the pressure introduction port and a gas chamber in the opposite side, wherein the bladder has a laminated structure constituted of a gas shielding layer, an inner elastic layer in an outer side thereof, an outer elastic layer in a further outer side thereof and a rubber layer in a more further outer side thereof, the gas shielding layer, the inner elastic layer and the outer elastic layer are made of a polyamide resin, and the gas shielding layer has a module of bending elasticity higher than that of the inner elastic layer and the outer elastic layer. In this case, it is also possible to effectively prevent the cushion gas within the gas chamber from being reduced due to a permeation, and to maintain the initial accumulating function and the pulsation absorbing function for a long time.

As a further preferable another example in the structure mentioned above, the rate of bending elasticity at −5° C. to −40° C. is set to a value of 3000 to 7000 MPa in the gas shielding layer, and a value not more than 3000 MPa in the inner elastic layer and the outer elastic layer. Accordingly, since resistance to cold is improved, a good operability of the bladder can be secured even in a low temperature environment, and it is possible to effectively prevent the cushion gas from leaking due to a crack or the like.

As another further preferable example in the structure mentioned above, the layer thickness A of the gas shielding layer, the layer thickness B of the inner elastic layer and the layer thickness C of the outer elastic layer are set so that A/B is not less than 0.5 and not more than 3 and C/B is not less than 4 and not more than 10, whereby it is possible to secure a proper curvature at a time when the bladder is exposed to the bending deformation in the low temperature environment of not more than 0° C.

BEST MODE FOR CARRYING OUT THE INVENTION

Figure 1:
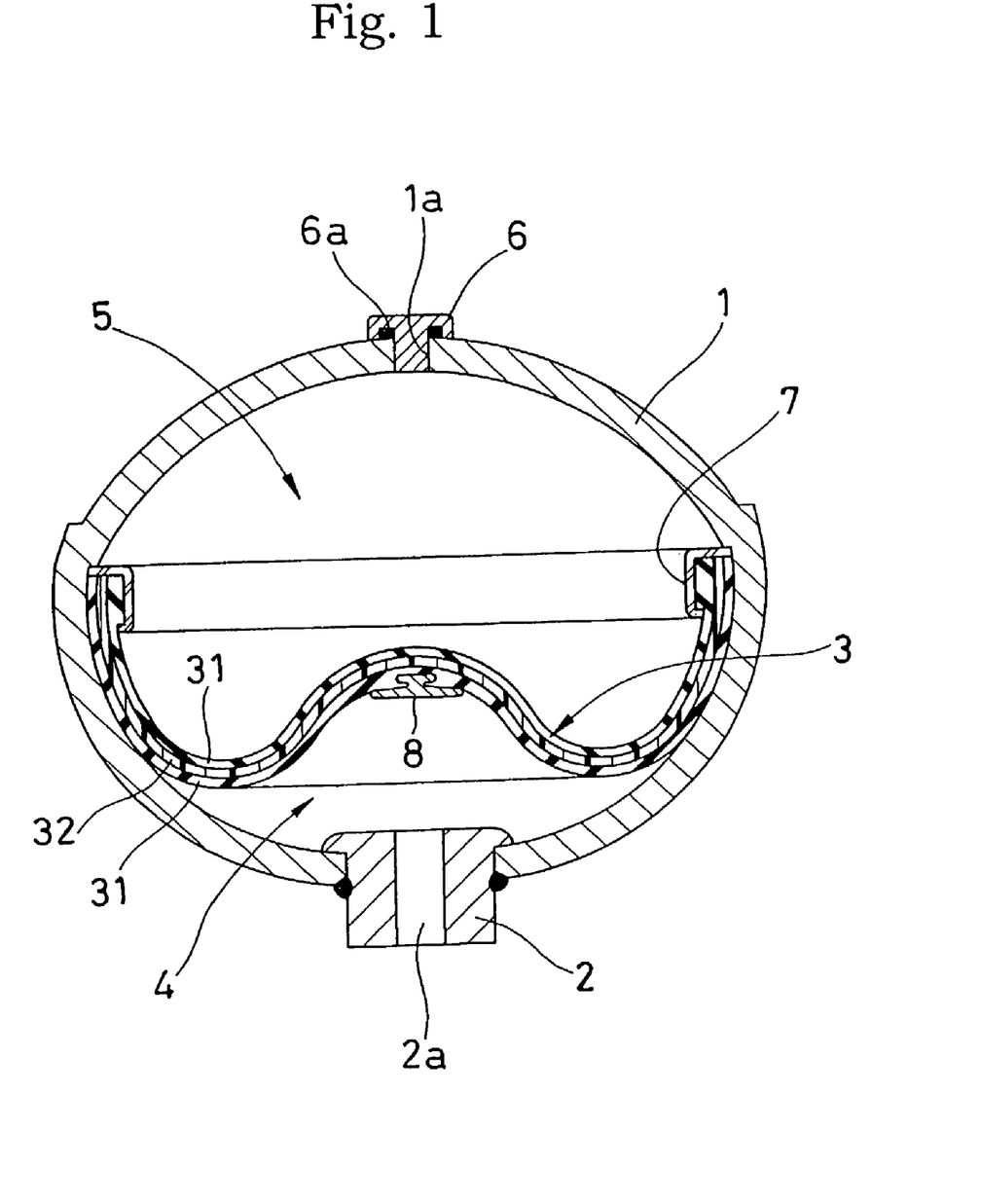
FIG. 1 is a cross sectional view showing a first embodiment of an accumulator in accordance with the present invention.
Figure 2:
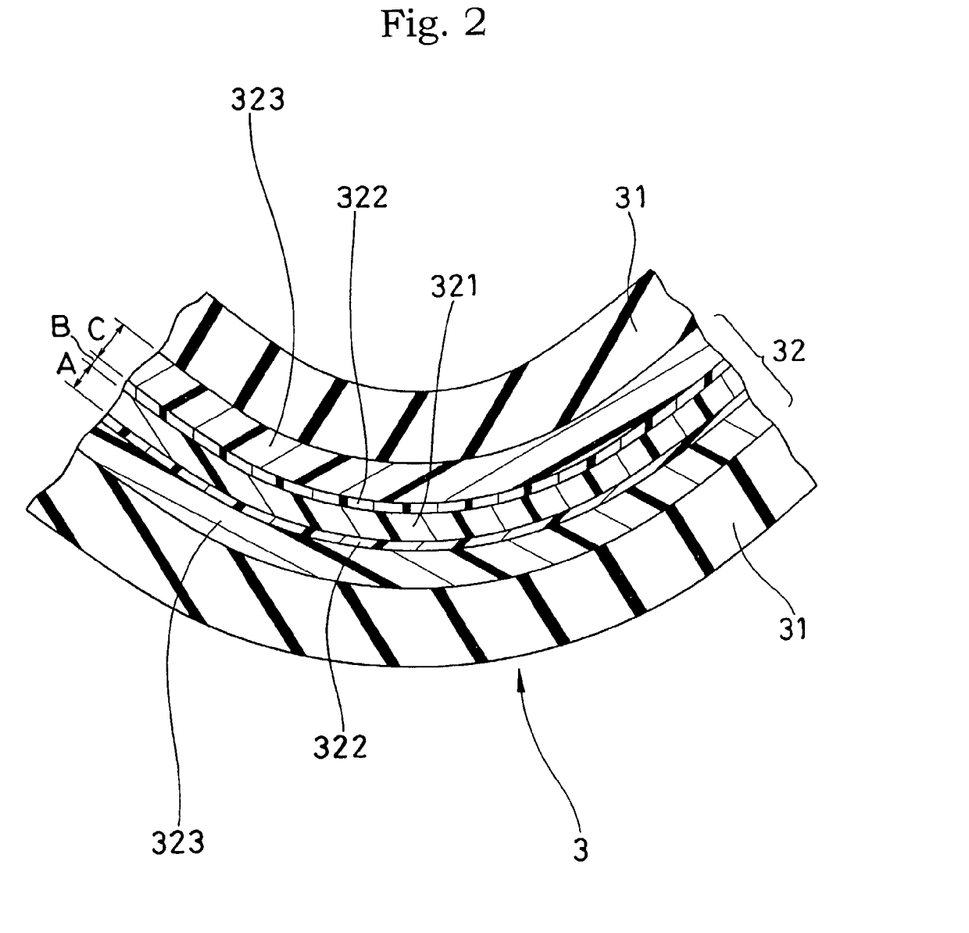
FIG. 2 is a partly cross sectional view of a bladder in the embodiment mentioned above.

FIGS. 1 and 2 show a first embodiment of an accumulator in accordance with the present invention. The accumulator in accordance with this embodiment is used, for example, as a pulsation absorbing means of a hydraulic apparatus in a motor vehicle. As a cross section of the whole thereof is shown in FIG. 1, the accumulator is provided with an outer shell 1, a pressure introduction port 2 branching and connecting the outer shell 1 from and to a piping of the hydraulic apparatus (not shown), and a diaphragm bladder 3 separating the internal space of the outer shell 1 into a pressure introduction chamber 4 in the side of the pressure introduction port 2 and a gas chamber 5 in the opposite side.

The outer shell 1 is made of a metal such as an iron based alloy, an aluminum based alloy or the like, and is formed in a substantially spherical shape. A cushion gas, for example, N2 gas is charged into the gas chamber 5 within the outer shell 1. The cushion gas is pressure inserted from a gas charge port 1a opened in the opposite side to the pressure introduction port 2 in the outer shell 1, and this gas charge port 1a is closely plugged by a gas plug 6 having a packing 6a after the cushion gas is pressure inserted. Further, a pressure inserting amount of the cushion gas in the gas chamber 5 is suitably determined on the basis of a magnitude of a hydraulic pressure applied to the pressure introduction chamber 4.

The bladder 3 is closely attached and fixed to the inner surface of the outer shell 1 by an annular holder 7 in which an outer peripheral edge is made of a metal, and is formed in a diaphragm shape capable of freely bending and displacing to the side of the pressure introduction chamber 4 or the side of the gas chamber 5. Further, a poppet 8 closing a fluid inlet and outlet port 2a and made of a metal such as an aluminum or the like is integrally provided in a center portion of a surface in the side of the pressure introduction chamber 4 in this bladder 3 in a state of being half embedded, for the purpose of preventing the bladder 3 from intruding into the fluid inlet and outlet port 2a in the pressure introduction port 2 at a time when the hydraulic pressure introduced into the side of the pressure introduction chamber 4 becomes lower than the cushion gas pressure in the gas chamber 5.

Further, the bladder 3 is formed in a laminated structure, as a partly cross section is shown in FIG. 2 in an enlarged manner, in which a synthetic resin laminated body 32 constituted of a center elastic layer 321, gas shielding layers 322 and 322 disposed in an outer side thereof and outer elastic layers 323 and 323 disposed in a further outer side thereof is interposed between rubber layers 31 and 31 made of a rubber material such as a nitrile rubber, a butyl rubber, a chlorinated polyethylene, a chlorosulfonated polyethylene, a fluorine-contained rubber or a styrene rubber, and a hydrogenation rubber thereof. The synthetic resin laminated body 32 is made of a polyamide resin excellent in an elasticity as a whole, that is, the center elastic layer 321, the gas shielding layer 322 and the outer elastic layer 323 are all made of a polyamide resin (PA). Further, the respective layers are bonded to each other. A layer thickness of the rubber layer 31 is 0.1 to 3 mm.

In detail, the center elastic layer 321 is made of a polyamide resin in which an elastic modulus in bending at −5 to −40° C. is 500 to 3000 MPa, the gas shielding layer 322 is made of a polyamide resin in which an elastic modulus in bending at −5 to −40° C. is 3100 to 6000 MPa, and the outer elastic layer 323 is made of a polyamide resin in which an elastic modulus in bending at −5 to −40° C. is 150 to 3000 MPa. Further, when setting a layer thickness of the center elastic layer 321 to A, setting a layer thickness of the gas shielding layer 322 to B and setting a layer thickness of the outer elastic layer 323 to C, all of A to C are generally 0.01 to 2 mm, and a rate of layer thickness is set so that A/B is not less than 1 and not more than 3, and C/B is not less than 4 and not more than 10.

When increasing the layer thickness B of the gas shielding layer 322, an amount of gas leakage is reduced, however, a flexibility is lost. A breakage is easily generated due to buckling at a time when the bladder is operated. On the contrary, when reducing the layer thickness, the amount of gas leakage is increased. When increasing the layer thickness A of the center elastic layer 321 and the layer thickness C of the outer elastic layer 323, it is possible to reduce the amount of gas leakage which is less than the case of the gas shielding layer 322 though. However, in this case, the whole of the synthetic resin laminated body 32 becomes thick, the whole thickness of the bladder 3 is thereby increased, so that a diaphragm rigidity is increased and a flexibility is deteriorated. In the present invention, proper ranges of A/B and C/B are found on the basis of the gas shielding property and the flexibility. That is, with respect to the layer thickness B of the gas shielding layer 322, the layer thickness A of the center elastic layer 321 is in a range from 1 to 3, and the layer thickness C of the outer elastic layer 323 is in a range from 4 to 10. In the case that the center elastic layer 321 and the outer elastic layer 323 are too thin in comparison with the gas shielding layer 322, or inversely too thick, breakage of the gas shielding layer 322 or the outer rubber layer 31 is generated, whereby it is impossible to achieve a function of the bladder.

The gas shielding layer 322 used in the present aspect is structured such that a gas permeation coefficient is made small by making a density high to a certain extent, and a desired flexibility can be secured under a low temperature environment not more than 0° C. In a value outside the range of the present embodiment, that is, when the elastic modulus in bending of the gas shielding layer 322 at −5 to −40° C. is less than 3100 MPa, the gas permeation coefficient becomes large, and the leakage due to permeation of the cushion gas in the gas chamber 5 is generated, and when it is more than 6000 MPa, it is impossible to secure a suitable flexibility under the low temperature environment not more than 0° C. Accordingly, the value is defined as mentioned above.

Next, a description will be given of a result obtained by executing an evaluation test of the gas shielding property and the flexibility in the first embodiment.

As an embodiment 1 in accordance with the present aspect, the polyamide resin forming the center elastic layer 321 is structured such that the elastic modulus in bending at −5° C. is 1430 MPa and the elastic modulus in bending at −30° C. is 1910 MPa, the polyamide resin forming the gas shielding layer 322 is structured such that the elastic modulus in bending at −5° C. is 2570 MPa and the elastic modulus in bending at −30° C. is 2940 MPa, and the polyamide resin forming the outer elastic layer 323 is structured such that the elastic modulus in bending at −5° C. is 1050 MPa and the elastic modulus in bending at −30° C. is 1820 MPa. Further, the layer thickness of the center elastic layer 321 is set to 80 μm, the layer thickness of the gas shielding layer 322 is set to 40 μm, and the layer thickness of the outer elastic layer 323 is set to 320 μm. Here, in this case, A/B is 2 and C/B is 8.

On the other hand, as a comparative embodiment 1, there is manufactured a synthetic resin laminated body in which the layer thickness A of the center elastic layer 321 is set to 100 μm, the layer thickness B of the gas shielding layer 322 is set to 10 μm, and the layer thickness C of the outer elastic layer 323 is set to 300 μm, that is, A/B is 10 and C/B is 30. Further, as a comparative embodiment 2, there is manufactured a synthetic resin laminated body in which the layer thickness A of the center elastic layer 321 is set to 40 μm, the layer thickness B of the gas shielding layer 322 is set to 100 μm, and the layer thickness C of the outer elastic layer 323 is set to 280 μm, that is, A/B is 0.4 and C/B is 2.8.

Further, the bladder 3 shown in FIG. 1 is formed by laminating the nitrile rubber having a thickness of about 1 mm on both outer surfaces of each of the synthetic resin laminated bodies in accordance with the embodiment 1 and the comparative embodiments 1 and 2, an accumulator is manufactured by using the bladder 3, and an evaluation test of the gas shielding property and the flexibility is executed.

A method of evaluation is as follows.

An amount of gas leakage is measured by measuring a gas amount per unit time leaking to the oil side at 80° C. in a state of charging N2 gas at 5 MPa into the gas chamber 5 at 25° C. and applying 20 MPa hydraulic pressure to the pressure introduction chamber 4. The unit is cc/(24 hr).

The flexibility is evaluated by charging N2 gas at 5 MPa into the gas chamber 5 at 25° C., applying the hydraulic pressure of 15 to 20 MPa to the pressure introduction chamber 4 at −40° C. periodically so as to apply repeated deformations to the bladder 3 and counting the number of deformations at a time of breaking.

Results of the evaluation test are as shown in the following Table 1.

TABLE 1

| | A/B | C/B | Amount of gas permeation (cc/24 hr) | Operation durability |
|---|---|---|---|---|
| Embodiment 1 | 2 | 8 | Approx. 33 | Test is interrupted because no breakage is generated until 100,000th time |
| Comparative Embodiment 1 | 10 | 30 | Approx. 120 | Test is interrupted because no breakage is generated until 100,000th time |
| Comparative Embodiment 2 | 0.4 | 2.8 | Approx. 12 | Breakage is generated after 30,000th time |

As is apparent from the evaluation result mentioned above, when the gas shielding layer B is too thin as in the comparative embodiment 1, the amount of gas permeation is much, and when the gas shielding layer B is too thick as in the comparative embodiment 2, the operation durability becomes significantly deteriorated. On the other hand, in accordance with the embodiment 1, it is confirmed that both of the gas permeability and the operation durability can be satisfied.

Accordingly, the center elastic layer 321 and the outer elastic layer 323 have the elastic modulus in bending smaller than that of the gas shielding layer 322, the elastic modulus in bending in the outer elastic layer 323 is smaller by a fixed amount than the elastic modulus in bending of the center elastic layer 321, and the ratio of layer thickness A/B is set to be smaller than C/B, that is, A<C, whereby a proper curvature at a time when the bladder 3 is exposed to the bending deformation under the low temperature environment can be secured. Further, accordingly it is possible to effectively restrict an increase of load in the gas shielding layer 322 in which the elastic modulus in bending is relatively large (hard), under the low temperature environment not more than 0° C.

The rubber layers 31 and 31 made of the rubber material such as the nitrile rubber, the butyl rubber, the styrene rubber or the like and disposed in the outer side of the synthetic resin laminated body 32 has an effect of applying a flexibility to the whole of the diaphragm 3 so as to restrict a generation of crack or the like due to the repeated bending deformation motions.

In the accumulator in accordance with the first embodiment mentioned above, since the bladder 3 is provided with the synthetic resin laminated body 32 made of the polyamide resin having an excellent elasticity between the rubber layers 31 and 31, and gives the gas shielding function to the synthetic resin laminated body 32, it is possible to effectively prevent the cushion gas in the gas chamber 5 from being reduced due to the permeation so as to maintain the initial pressure storing function and pulsation absorbing function for a long period, and it is possible to use in a maintenance free state for a long period, for example, 15 to 20 years. Further, a response against a pressure change becomes excellent with the help of the elasticity of the polyamide resin forming the synthetic resin laminated body 32, and the elasticity of the rubber layers 31 and 31 disposed in the outer side thereof.

Further, since the synthetic resin laminated body 32 in the bladder 3 is made of the polyamide resin, not only the operability and the durability under a condition from a room temperature to a high temperature are good, but also resistance to cold under the low temperature environment of −40° C. to 0° C. is improved. Accordingly, it is possible to effectively prevent the crack or the like from being generated in the gas shielding layer 322 in the synthetic resin laminated body 32, and prevent the cushion gas in the gas chamber 5 from leaking to thereby deteriorate the function.

In this case, in this embodiment, the outer elastic layer 323 may be made of an ester based elastic plastic.

Figure 3:
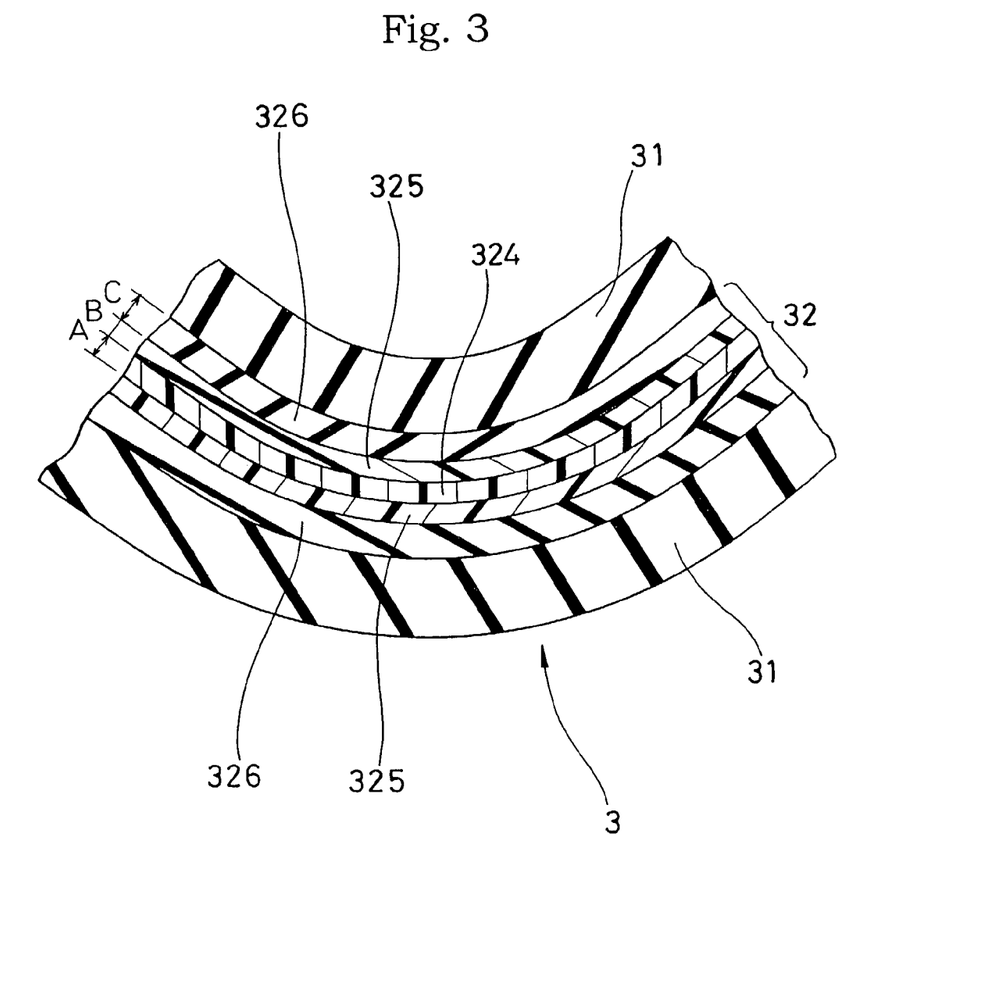
FIG. 3 is a partly cross sectional view of a bladder showing a second embodiment of an accumulator in accordance with the present invention.

Next, FIG. 3 is a partly cross sectional view of a bladder showing a second embodiment of the accumulator in accordance with the present invention. The accumulator in accordance with this embodiment is the same as that in FIG. 1 described above in an outline structure of whole, and a different point exists in that the synthetic resin laminated body 32 of the bladder 3 is formed in a laminated structure constituted of a gas shielding layer 324 made of an ethylene vinylalcohol copolymer and disposed substantially in the center in the thickness direction, inner elastic layers 325 and 325 made of a polyamide resin and disposed in an outer side thereof, and outer elastic layers 326 and 326 made of an ester based elastic plastic and disposed in a further outer side thereof. The synthetic resin laminated body 32 is interposed between the rubber layers 31 and 31 which are made of a rubber material such as a nitrile rubber, a butyl rubber, a chlorinated polyethylene, a chlorosulfonated polyethylene, a fluorine-contained rubber or a styrene rubber, and a hydrogenation rubber thereof, and the respective layers are bonded to each other.

The ethylene vinylalcohol copolymer employed for the gas shielding layer 324 is excellent in a gas permeability resistance, and has a comparatively large elastic modulus so as to become hard to be expanded on the other hand, the inner elastic layers 325 and 325 in the outer side thereof has a smaller elastic modulus than that of the gas shielding layer 324, and the outer elastic layers 326 and 326 in the further outer side thereof has a further smaller elastic modulus. That is, in accordance with this embodiment, a desired flexibility under a low temperature condition not more than 0° C. is secured by gradually reducing a rigidity from the center portion in the thickness direction toward the outer side, and no crack or the like is generated in the gas shielding layer 324 by the long time use. Further, since the inner elastic layers 325 and 325 are made of a polyamide resin having an elastic modulus in bending in the middle of those of the gas shielding layer 324 and the outer elastic layer 326, it has a gas shielding function next to the gas shielding layer 324.

Next, a description will be given of a result obtained by executing an evaluation test of the gas shielding property and the flexibility in the second embodiment.

As an embodiment 2 in accordance with the present aspect, there is manufactured a synthetic resin laminated body in which the layer thickness A of the gas shielding layer 324 made of an ethylene vinylalcohol copolymer is set to 60 μm, the layer thickness B of the inner elastic layer 325 made of a polyamide resin is set to 60 μm, and the layer thickness C of the outer elastic layer 326 made of an ester based elastic plastic is set to 310 μm, that is, A/B is 1 and C/B is 5.2.

On the other hand, as a comparative embodiment 3, there is manufactured a synthetic resin laminated body in which the layer thickness A of the gas shielding layer 324 made of an ethylene vinylalcohol copolymer is set to 10 μm, the layer thickness B of the inner elastic layer 325 made of a polyamide resin is set to 100 μm, and the layer thickness C of the outer elastic layer 326 made of an ester based elastic plastic is set to 300 μm, that is, A/B is 10 and C/B is 30. Further, as a comparative embodiment 4, there is manufactured a synthetic resin laminated body in which the layer thickness A of the gas shielding layer 324 made of an ethylene vinylalcohol copolymer is set to 100 μm, the layer thickness B of the inner elastic layer 325 made of a polyamide resin is set to 40 μm, and the layer thickness C of the outer elastic layer 326 made of an ester based elastic plastic is set to 300 μm, that is, A/B is 0.4 and C/B is 3.

Further, the bladder 3 is formed by laminating the nitrile rubber having a thickness of about 1 mm on both outer surfaces of each of the synthetic resin laminated bodies in accordance with the embodiment 2 and the comparative embodiments 3 and 4, an accumulator is manufactured by using the bladder 3, and an evaluation test of the gas shielding property and the flexibility is executed in accordance with the same method as the evaluation test in the embodiment 1 and the comparative embodiments 1 and 2 described above.

Results of the evaluation test are as shown in the following Table 2.

TABLE 2

|  | A/B | C/B | Amount of gas permeation (cc/24 hr) | Operation durability |
| --- | --- | --- | --- | --- |
| Embodiment 2 | 1 | 5.2 | Approx. 35 | Test is interrupted because no breakage is generated until 100,000th time |
| Comparative Embodiment 5 | 10 | 30 | Approx. 160 | Test is interrupted because no breakage is generated until 100,000th time |
| Comparative Embodiment 6 | 0.4 | 3 | Approx. 20 | Breakage is generated at 60,000th time |

In the evaluation result mentioned above, in accordance with the embodiment 2, it is confirmed that both of the gas permeability and the operation durability can be satisfied.

Accordingly, in the accumulator in accordance with the second embodiment mentioned above, the synthetic resin laminated body 32 interposed between the rubber layers 31 and 31 of the bladder 3 can effectively prevent the cushion gas in the gas chamber 5 from being reduced due to the permeation so as to maintain the initial pressure storing function and pulsation absorbing function for a long period, with the help of the gas shielding layer 324 made of an ethylene vinylalcohol copolymer. Further, since the structure is made in the laminated structure in which the rigidity is gradually reduced from the gas shielding layer 324 existing in the center portion in the thickness direction toward the outer layer side, the load of the gas shielding layer 324 due to the bending is reduced, the crack or the like is hard to be generated even under the low temperature environment not more than 0° C. and resistance to cold is improved.

Figure 4:
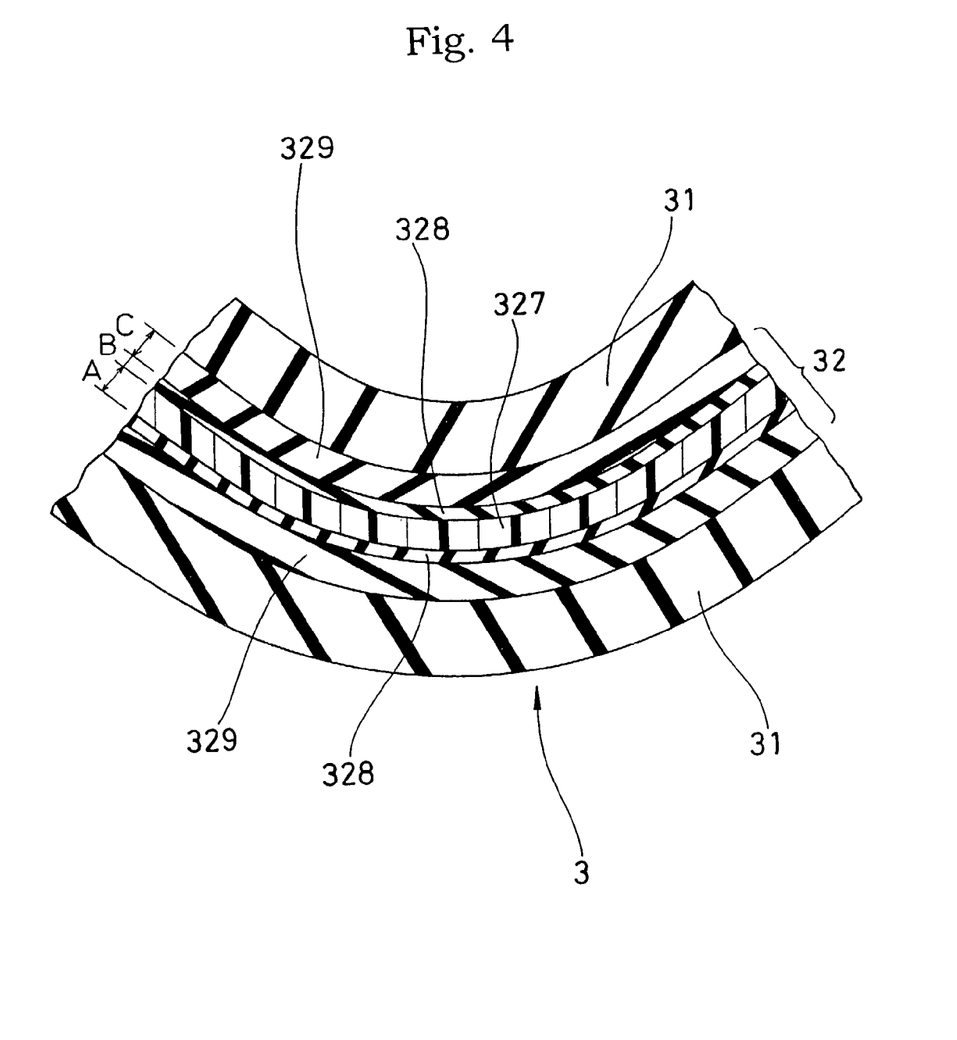
FIG. 4 is a partly cross sectional view of a bladder showing third and fourth embodiments of an accumulator in accordance with the present invention.

Next, FIG. 4 is a partly cross sectional view of a bladder 3 showing a third embodiment of the accumulator in accordance with the present invention. This embodiment is basically the same as the second embodiment described above, that is, the synthetic resin laminated body 32 of the bladder 3 is formed in a laminated structure constituted of a gas shielding layer 327 disposed substantially in the center in the thickness direction, inner elastic layers 328 and 328 disposed in an outer side thereof, and outer elastic layers 329 and 329 disposed in a further outer side thereof. The synthetic resin laminated body 32 is interposed between the rubber layers 31 and 31 which are made of a rubber material such as a nitrile rubber, a butyl rubber, a chlorinated polyethylene, a chlorosulfonated polyethylene, a fluorine-contained rubber or a styrene rubber, and a hydrogenation rubber thereof. However it is different from the second embodiment in view that the gas shielding layer 327 is made of a polyamide resin.

In detail, the gas shielding layer 327 is made of a polyamide resin in which an elastic modulus in bending at −5 to −40° C. is 3000 to 7000 MPa, the inner elastic layers 328 and 328 are made of a polyamide resin in which an elastic modulus in bending at −5 to −40° C. is not more than 3000 MPa, and the outer elastic layers 329 and 329 are made of an ester based elastic plastic in which an elastic modulus in bending at −5 to −40° C. is not more than 3000 MPa.

The polyamide resin has a property of maintaining a desired elasticity even under the low temperature environment not more than 0° C. as described above, and the polyamide resin, in which the coefficient of gas permeability is reduced by increasing a molecular density thereof, is employed as the gas shielding layer 327. Further, in the gas shielding layer 327 made of the polyamide resin, the coefficient of gas permeability becomes large and over an allowable permeation amount for cushion gas of the gas chamber 5 in the case that the elastic modulus in bending at −5 to −40° C. degrees is less than 3000 MPa, and a proper flexibility under the low temperature environment not more than 0° C. can not be secured in the case that it is over 7000 MPa. Accordingly, it is defined to the value mentioned above.

Next, a description will be given of a result obtained by executing an evaluation test of the gas shielding property and the flexibility in the third embodiment.

As an embodiment 3 in accordance with the present aspect, the polyamide resin forming the gas shielding layer 327 is structured such that the elastic modulus in bending at −5° C. is 5100 MPa and the elastic modulus in bending at −30° C. is 5270 MPa, the polyamide resin forming the inner elastic layer 328 is structured such that the elastic modulus in bending at −5° C. is 554 MPa and the elastic modulus in bending at −30° C. is 562 MPa, and the ester based elastic plastic forming the outer elastic layer 329 is structured such that the elastic modulus in bending at −5° C. is 996 MPa and the elastic modulus in bending at −30° C. is 1510 MPa. Further, the layer thickness of each of the gas shielding layer 327 and the inner elastic layer 328 is set to 60 μm, and the layer thickness of the outer elastic layer 329 is set to 310 μm. In this case, A/B is 1 and C/B is 5.2.

On the other hand, as a comparative embodiment 5, there is manufactured a synthetic resin laminated body in which the layer thickness A of the gas shielding layer 327 made of the polyamide resin is set to 10 μm, the layer thickness B of the inner elastic layer 328 made of the polyamide resin is set to 100 μm, and the layer thickness C of the outer elastic layer 329 made of the ester based elastic plastic is set to 300 μm, that is, A/B is 10 and C/B is 30. Further, as a comparative embodiment 6, there is manufactured a synthetic resin laminated body in which the layer thickness A of the gas shielding layer 327 made of the polyamide resin is set to 100 μm, the layer thickness B of the inner elastic layer 328 made of the polyamide resin is set to 40 μm, and the layer thickness C of the outer elastic layer 329 made of the ester based elastic plastic is set to 300 μm, that is, A/B is 0.4 and C/B is 3.

Further, the bladder 3 is formed by laminating the nitrile rubber having a thickness of about 1 mm on both outer surfaces of each of the synthetic resin laminated bodies in accordance with the embodiment 3 and the comparative embodiments 5 and 6, an accumulator is manufactured by using the bladder 3, and an evaluation test of the gas shielding property and the flexibility is executed on the basis of the same method of the evaluation test of the embodiment 1 and the comparative embodiments 1 and 2 described above.

Results of the evaluation test are as shown in the following Table 3.

TABLE 3

|  | A/B | C/B | Amount of gas permeation (cc/24 hr) | Operation durability |
| --- | --- | --- | --- | --- |
| Embodiment 3 | 1 | 5.2 | Approx. 27 | Test is interrupted because no breakage is generated until 100,000th time |
| Comparative Embodiment 5 | 10 | 30 | Approx. 115 | Test is interrupted because no breakage is generated until 100,000th time |

TABLE 3-continued

|  | A/B | C/B | Amount of gas permeation (cc/24 hr) | Operation durability |
|---|---|---|---|---|
| Comparative Embodiment 6 | 0.4 | 3 | Approx. 16 | Breakage is generated at 70,000th time |

That is, in the third embodiment (the third example), since the polyamide resin excellent in the elasticity under the low temperature environment and having the improved gas shielding function due to the high molecular density is employed for the gas shielding layer 327 and the rigidity is reduced from the gas shielding layer 327 existing in the center portion in the thickness direction toward the outer layer side, it is possible to effectively prevent the cushion gas in the gas chamber 5 from being reduced due to the permeation so as to maintain the initial pressure storing function and pulsation absorbing function for a long period, and it is possible to use in a maintenance free state for a long period. Further, since the synthetic resin laminated body 32 interposed between the outer rubber layers 31 and 31 is excellent in an elasticity as a whole, a response against a pressure change becomes excellent.

Further, since in the polyamide resin employed for the gas shielding layer 327, not only the operability and the durability under a condition from a room temperature to a high temperature are good, but also resistance to cold under the low temperature environment of −40° C. to 0° C. is excellent, no crack is generated in the gas shielding layer 327 even under a cold condition and it is possible to effectively prevent the cushion gas in the gas chamber 5 from leaking to thereby deteriorate the function.

Further, in a fourth embodiment of the accumulator in accordance with the present invention, all of the gas shielding layer 327, the inner elastic layer 328 and the outer elastic layer 329 in the third embodiment are made of the polyamide resin. In this case, the same effects can be achieved. Preferably, the polyamide resin of the gas shielding layer 327 is structured such that the elastic modulus in bending at −5 to −40° C. is 3000 to 7000 MPa, the polyamide resin of the inner elastic layer 328 is structured such that the elastic modulus in bending at −5 to −40° C. is not more than 3000 MPa, and the polyamide resin of the outer elastic layer 329 is structured such that the elastic modulus in bending at −5 to −40° C. is also not more than 3000 MPa. Further, when the layer thickness A of the gas shielding layer 327 is set to A, the layer thickness of the inner elastic layer 328 is set to B, and the layer thickness of the outer elastic layer 329 is set to C, A/B is set to be not less than 0.5 and not more than 3, and C/B is set to be not less than 4 and not more than 10.

Next, a description will be given of a result obtained by executing an evaluation test of the gas shielding property and the flexibility in the fourth embodiment.

As an embodiment 4 in accordance with the present aspect, the polyamide resin forming the gas shielding layer 327 is structured such that the elastic modulus in bending at −5° C. is 5100 MPa and the elastic modulus in bending at −30° C. is 5270 MPa, the polyamide resin forming the inner elastic layer 328 is structured such that the elastic modulus in bending at −5° C. is 554 MPa and the elastic modulus in bending at −30° C. is 562 MPa, and the polyamide resin forming the outer elastic layer 329 is structured such that the elastic modulus in bending at −5° C. is 480 MPa and the elastic modulus in bending at −30° C. is 692 MPa. Further, the layer thickness of each of the gas shielding layer 327 and the inner elastic layer 328 is set to 60 μm, and the layer thickness of the outer elastic layer 329 is set to 310 μm. In this case, A/B is 1 and C/B is 5.2.

On the other hand, as a comparative embodiment 7, there is manufactured a synthetic resin laminated body in which the layer thickness A of the gas shielding layer 327 made of the polyamide resin is set to 10 μm, the layer thickness B of the inner elastic layer 328 made of the polyamide resin is set to 100 μm, and the layer thickness C of the outer elastic layer 329 made of the polyamide resin is set to 300 μm, that is, A/B is 10 and C/B is 30. Further, as a comparative embodiment 8, there is manufactured a synthetic resin laminated body in which the layer thickness A of the gas shielding layer 327 made of the polyamide resin is set to 100 μm, the layer thickness B of the inner elastic layer 328 made of the polyamide resin is set to 40 μm, and the layer thickness C of the outer elastic layer 329 made of the polyamide resin is set to 300 μm, that is, A/B is 0.4 and C/B is 3.

Further, the bladder 3 is formed by laminating the nitrile rubber having a thickness of about 1 mm on both outer surfaces of each of the synthetic resin laminated bodies in accordance with the embodiment 4 and the comparative embodiments 7 and 8, an accumulator is manufactured by using the bladder 3, and an evaluation test of the gas shielding property and the flexibility is executed on the basis of the same method of the evaluation test of the embodiment 1 and the comparative embodiments 1 and 2 described above.

Results of the evaluation test are as shown in the following Table 4.

TABLE 4

|  | A/B | C/B | Amount of gas permeation (cc/24 hr) | Operation durability |
|---|---|---|---|---|
| Embodiment 4 | 1 | 5.2 | Approx. 29 | Test is interrupted because no breakage is generated until 100,000th time |
| Comparative Embodiment 7 | 10 | 30 | Approx. 120 | Test is interrupted because no breakage is generated until 100,000th time |
| Comparative Embodiment 8 | 0.4 | 3 | Approx. 17 | Breakage is generated until 70,000th time |

That is, on the basis of the test mentioned above, even when all of the gas shielding layer 327, the inner elastic layer 328 and the outer elastic layer 329 are made of the polyamide resin, it is confirmed that the same effects as those of the third embodiment can be achieved.

INDUSTRIAL APPLICABILITY

As described above, the accumulator in accordance with the present invention can be utilized as a means which is provided in a pipe of the equipment so as to temporarily accumulate the pressure within the piping flow passage or absorb the pulsation of the fluid pressure generated within the pipe by the pump or the like. Further, since the synthetic resin laminated body made of the polyamide is provided between the rubber layers of the bladder which sections the pressure introduction chamber to which the fluid pressure is introduced, and the gas chamber in which the cushion gas is charged, and the gas shielding function is given to the synthetic resin laminated body, it is possible to effectively prevent the cushion gas from being reduced due to the permeation, and it is possible to maintain the initial accumulating function and the pulsation absorbing function for a long time. Further, since resistance to cold under the cold environment at −40° C. to 0° C. is improved, the improved operability of the bladder can be secured under the low temperature environment, and it is possible to effectively prevent the cushion gas from being leaked due to the crack or the like.

Further, when the synthetic resin laminated body of the bladder is constituted of the gas shielding layer made of the ethylene-vinyl alcohol copolymer, the inner elastic layers disposed in both sides thereof and made of the polyamide resin, and the outer elastic layers disposed in the outer sides thereof and made of the ester based elastic plastic, or constituted of the gas shielding layer made of the polyamide resin having the gas shielding function, the inner elastic layer having the elastic modulus in bending smaller than the gas shielding layer, and the outer elastic layer made of the ester based elastic plastic, it is similarly possible to effectively prevent the cushion gas from being reduced due to the permeation and it is possible to maintain the initial accumulating function and pulsation absorbing function for a longtime. Further, resistance to cold is improved, so that the improved operability of the bladder can be secured and the cushion gas leakage due to the crack or the like can be effectively prevented even under the low temperature environment.

What is claimed is:

1. An accumulator comprising:
   an outer shell (1) branched from and connected to a piping via a pressure introduction port (2); and
   a bladder (3) separating an internal space of the outer shell (1) into a pressure introduction chamber (4) in the side of the pressure introduction port (2) and a gas chamber (5) in the opposite side,
   wherein the bladder (3) has a laminated structure constituted of a gas shielding layer (327), an inner elastic layer (328) in an outer side thereof, an outer elastic layer (329) in a further outer side thereof and a rubber layer (31) in a more further outer side thereof, the gas shielding layer (327) and the inner elastic layer (328) are made of a polyamide resin, and the outer elastic layer (329) is made of an ester based elastic plastic.

2. An accumulator as claimed in claim 1, wherein the module of bending elasticity at −5° C. to −40° C. is set to a value of 3000 to 7000 MPa in the gas shielding layer (327), and a value not more than 3000 MPa in the inner elastic layer (328) and the outer elastic layer (329).

3. An accumulator as claimed in claim 1, wherein the layer thickness A of the gas shielding layer (327), the layer thickness B of the inner elastic layer (328) and the layer thickness C of the outer elastic layer (329) are set so that A/B is not less than 0.5 and not more than 3 and C/B is not less than 4 and not more than 10.

* * * * *